United States Patent [19]

Sato

[11] Patent Number: 5,678,066
[45] Date of Patent: Oct. 14, 1997

[54] CAMERA WITH A VISUAL LINE DETECTION SYSTEM

[75] Inventor: Shigemasa Sato, Kanagawa-ken, Japan

[73] Assignee: Nikon Corporation, Tokyo, Japan

[21] Appl. No.: 758,809

[22] Filed: Dec. 4, 1996

Related U.S. Application Data

[63] Continuation of Ser. No. 374,072, Jan. 19, 1995, abandoned.

[30] Foreign Application Priority Data

Jan. 31, 1994 [JP] Japan ................................ 6-009844

[51] Int. Cl.$^6$ .................................................. G03B 13/36
[52] U.S. Cl. ............................ 396/51; 396/123; 396/137; 348/78
[58] Field of Search ........................... 396/51, 121, 123, 396/137, 554; 348/78

[56] References Cited

U.S. PATENT DOCUMENTS

| | | | |
|---|---|---|---|
| 5,214,466 | 5/1993 | Nagano et al. | 354/402 |
| 5,455,654 | 10/1995 | Suzuki | 354/402 |

FOREIGN PATENT DOCUMENTS

| | | |
|---|---|---|
| 63-94232 | 4/1988 | Japan . |
| 1-279215 | 11/1989 | Japan . |

*Primary Examiner*—Daniel P. Malley
*Attorney, Agent, or Firm*—Oliff & Berridge

[57] ABSTRACT

A user-friendly camera with a visual line detection system simplifies the operation by making manual selection possible for establishing an auto focus region directly without going through time consuming procedures, even when the camera is selecting an auto focus region based on visual line information. An auto selection mode, a visual line selection mode, and a manual selection mode are available for establishing an auto focus region with mode selection being made by an auto focus region switching system. When selection of the auto focus region is being executed in the visual line selection mode, signals from the auto focus region manual selection system may be entered so that the manual selection input takes priority and the intention of the photographer becomes the priority. The change of mode is temporarily executed easily during the visual line selection mode operation.

19 Claims, 7 Drawing Sheets

CAMERA WITH A VISUAL LINE DETECTION SYSTEM

This is a Continuation of application Ser. No. 08/374,072 filed Jan. 19, 1995, now abandoned.

BACKGROUND OF THE INVENTION

1. Field of the Invention

The present invention concerns a camera operable in a mode to establish a region based on visual line information and in a mode to establish a region by manual selection, with selection by the manual selection mode having priority over the visual line selection mode.

2. Description of Related Art

In recent years, a camera with an auto focus mechanism has been proposed wherein a multiplicity of regions in which automatic focusing can be performed is provided within the photographic region, and an automatic focusing operation is executed in a selected region. A method to establish a region based on visual line information and a method to establish a region by manual selection are possible for selection of a region. Moreover, in some cameras, a region is selected automatically.

Among the methods to establish a region based on visual line information, a method exists in which the direction of the visual line is obtained by detecting the movement of an eyeball of the photographer. In such methods, infrared light is reflected off the eyeball of a photographer looking into the finder. The movement of the pupil is detected based on the output from each light receiving element of the multiplicity of light receiving elements that receive the reflected light, in a technology exemplified by Japanese Laid-Open Patent Application No. 63-94232.

On the other hand, several methods exist for establishing the region by manual selection, one of which is the selection of a specific region from among the multiplicity of regions by providing a selection switch, in a technology exemplified by Japanese Laid-Open Patent Application No. 1-279215.

The method mentioned above of establishing a region based on visual line information is convenient, but because the region of automatic focus is determined by the movement of the eyeball of the photographer, the intention of the photographer is not always taken into consideration. In order to address situations such as this, a manual selection member is provided to establish a region, even in a camera with a visual line detection function to establish a region based on visual line information.

In order to establish a region in which to perform automatic focus by a manual selection member in a camera such as mentioned above, in which a region can be established based on visual line information or by a manual selection member, and in a situation where a visual line detection operation is used to establish an auto focus region, the following steps may be necessitated:

1. stop the photographic operation temporarily,
2. switch from the auto focus region selection mode to the manual selection mode, and
3. resume the photographic operation.

One of the examples of accomplishing the above is to cancel the half-depressed condition of the release button and to operate a switch provided on the body of the camera or on the lens barrel to change the auto focus region selection mode from the visual line selection mode to the manual selection mode. Then the photographic operation is resumed.

However, going through such steps as explained above takes time and may result in losing the chance to take a picture of the desired subject. Moreover, such procedures make the camera more difficult to use because the photographer must memorize the procedures, which becomes an extra burden and sometimes, especially in an instantaneous situation, may cause the photographer to make mistakes in the procedure.

SUMMARY OF THE INVENTION

An object of the present invention is to provide a user-friendly camera with a visual line detection system that simplifies the operation by making a manual selection operation possible for establishing an auto focus region directly without going through time consuming steps, even in a camera in which an auto focus region is established based on visual line information.

The camera according to embodiments of the present invention is capable of realizing an automatic mode, a visual line selection mode, and a manual selection mode in choosing an auto focus region, selection being accomplished by an auto focus region switching system. Moreover, even when the selection of an auto focus region is accomplished using the visual line selection mode, manual selection input takes over (i.e., overrides the visual line information mode) with the entering of command signals from the auto focus region manual selection system. Thus, the intention of the photographer is taken into consideration. Also, temporary switching of modes can easily be accomplished when in the visual line selection mode without having to go through complicated operations. Furthermore, if a manual selection is not performed after the switching of a mode, the camera will automatically return to the visual line selection mode after the elapse of a specified time interval.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

An embodiment of the present invention is described hereafter with reference to drawings.

Figure 8:
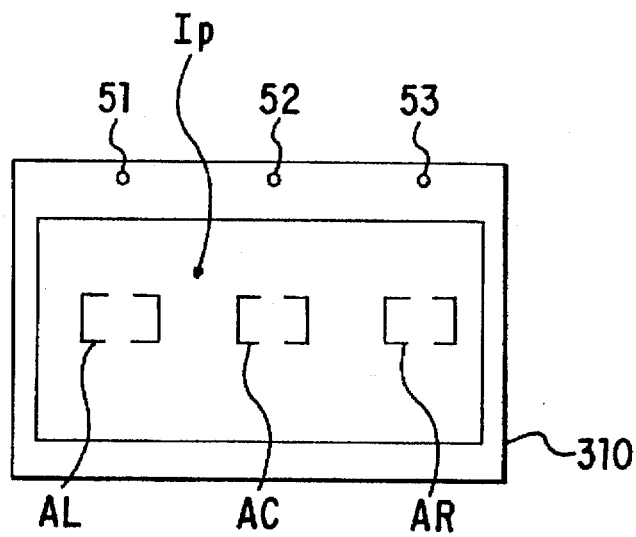
FIG. 8 is an illustration showing each example of the auto focus region, visual point display system and auto focus region display system within the finder in the embodiment of FIG. 1.

According to the present embodiment, auto focus regions are established in three locations in the photo field, AL on the left, AC in the middle, and AR on the right as shown in FIG. 8. Furthermore, with the present embodiment there are three types of selection modes: the automatic selection mode, the visual line selection mode, and the manual selection mode, which are possible in selecting an auto focus region. However, with the invention, it is also possible to perform manual selection during the enabling of the visual line selection mode.

The auto selection mode is a mode wherein each distance measurement is performed at three locations to give the data necessary to compute the photo lens driving amount and to automatically establish an auto focus region.

Figure 1:
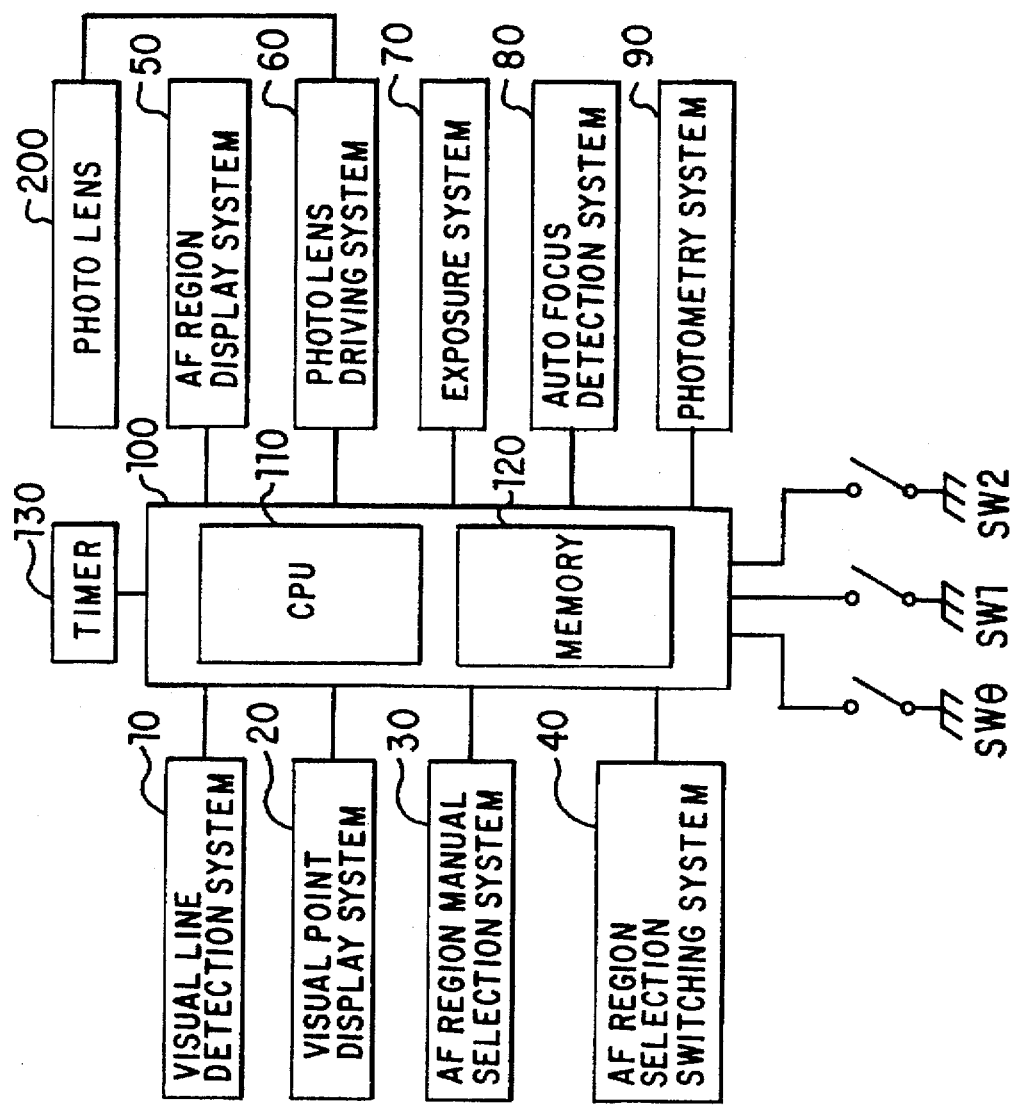
FIG. 1 is a block diagram showing a structure of an embodiment of a camera according to the present invention.

FIG. 1 shows the structure of a camera according to an embodiment of the present invention. The camera in the present embodiment comprises a camera body 300 (see FIG. 6), a photo lens 200, a control system 100, and devices with various capabilities connected to the control system 100.

The control system 100 comprises a central processing unit (CPU) 110 that accomplishes various control computations, a memory 120 that stores various control processing programs executed by CPU 110, control data, control parameters, etc. Among control processing programs, there are, for example, distance measurement computations, photometric computations, fixation point computations, and auto focus region selection processing to be explained later, etc. Distance measurement computation is executed to determine the focusing position based upon signals from the auto focus detection system 80 to be explained later. Also, photometric computation is executed to determine optimum exposure conditions, such as exposure time, based upon signals from the photometric system 90 to be explained later. Furthermore, fixation point computation is executed to determine the location that the eyeball of the photographer fixes through the finder, enabling the execution of auto focus region selection based upon the visual line. Incidentally, the computation of the fixation point can be used for the selection of functions other than the selection of an auto focus region.

In the memory 120, the auto focus default value, which is data specifying AC in the middle, and other control data are stored beforehand. Also, the latest data showing the auto focus region are updated and stored in the memory 120. In special cases, one of these data will be used, to be explained later, so the photographer will select beforehand which auto focus region should be used. However, default data selection should be provided where no selection has been made. Of course, it is possible to make the default the only possible selection.

Devices with the above various capabilities include the visual line detection system 10 to detect the direction of fixation of the eyeball of the photographer looking through the finder; the visual point display system 20 showing the location of the detected fixation; the auto focus region manual selection system 30 to manually establish an auto focus region; the auto focus region selection switching system 40; the auto focus region display system 50 to display the auto focus region; the photo lens driving system 60 to move the photo lens 200 to the location matching the distance to the subject; the exposure system 70 to control the shutter and diaphragm based upon exposure conditions obtained by photometric computation; the auto focus detection system 80 to obtain the focusing position by detecting the distance to the subject; and the photometric system 90 to detect the luminance of the photo field.

The visual line detection system 10 determines the fixation point of the photographer by detecting the movement of the eyeball of the photographer looking through the finder 310. For example, the visual line detection system 10 comprises, as explained above, infrared light generating elements, a multiplicity of light receiving elements that receive reflected light, and a driving circuit to drive the elements (none of them are presented in the drawings). Signals to determine the fixation point of the photographer within the photo field are sent from the driving circuit to the control system 100.

The visual point display system 20 comprises, for example, elements capable of displaying light points at proper locations, or a two dimensional diode array, etc., to be more specific. The illuminance point $I_p$ corresponding to the visual point detected is projected on a screen, enabling verification of the visual point within the finder. In cases in which the visual point is determined and displayed on a one dimensional line, elements such as a one dimensional light emitting diode array can be used.

Figure 9:
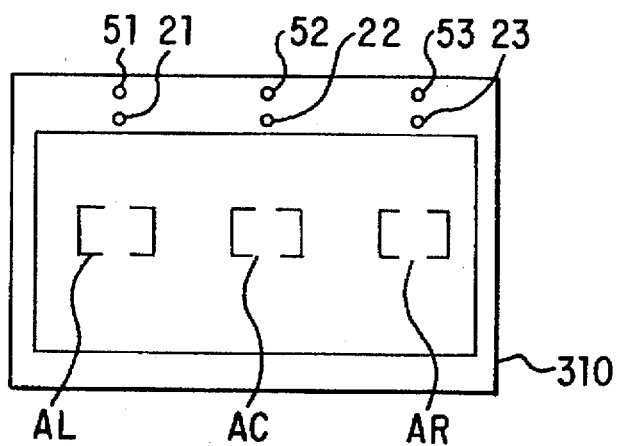
FIG. 9 is an illustration showing another example of the visual point display system within the finder in the embodiment of FIG. 1.

Furthermore, the visual point display system 20 is not restricted to the above structures. For example, another structure such as shown in FIG. 9 is useful as a system performing a simple display. The visual point system 20 shown in FIG. 9 comprises a multiplicity of light emitting diodes positioned to correspond to an auto focus location. To be more specific, three light emitting diodes, 21, 22, and 23, are positioned to correspond to three auto focus regions, AL on the left, AC in the middle and AR on the right in the photo screen as shown in FIG. 9. The flashing of the diodes is seen within the finder 310. Upon receiving signals from the control system 100, the diode corresponding to the visual point emits light.

The auto focus region display system 50 comprises three light emitting diodes 51, 52, and 53, which are positioned corresponding to three auto focus regions, namely, AL on the left, AC in the middle and AR on the right in the photo field as shown in FIG. 8. The light emitting diode corresponding to the auto focus region selected flashes.

Figure 10:
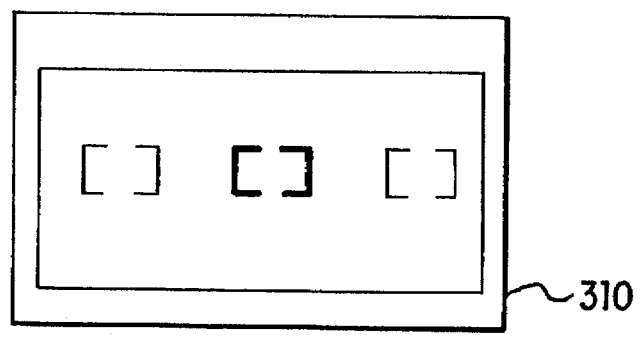
FIG. 10 is an illustration showing another example of the auto focus region display system within the finder in the embodiment of FIG. 1.

Furthermore, the auto focus region display system 50 is not limited to the above structure. FIG. 10 shows another example. The auto focus region display system in FIG. 10 comprises elements capable of executing display functions within a transparent region such as display elements including liquid crystal display elements or electrochromic devices. Using these elements, a pattern unique to each region is displayed at positions corresponding to the three auto focus regions, AL on the left, AC in the middle and AR on the right in the photo field of the finder. Upon selection of one region, the pattern indicating the region is emphasized and displayed, enabling the verification of the auto focus region selected within the finder. Such methods as making the section thicker, reversing light and dark shades, and flashing or coloring with specific colors are possible to emphasize and display the pattern. More specifically, the above emphasis and display can be accomplished by having the display elements driving circuit vary the driving voltage for the pattern within the field region corresponding to specific display elements.

The auto focus region manual selection system 30 is a system for manually instructing which region is to be selected, and comprises shift buttons 32L and 32R, which are used to specify the auto focus region. An arrow indicating the direction of the shift is provided on each of the buttons 32L and 32R. Each time the shift button 32L is pushed, the auto focus region to be selected moves to the left by one region, while the push of shift button 32R causes the auto focus region to be selected to move to the right by one region.

Figure 6:
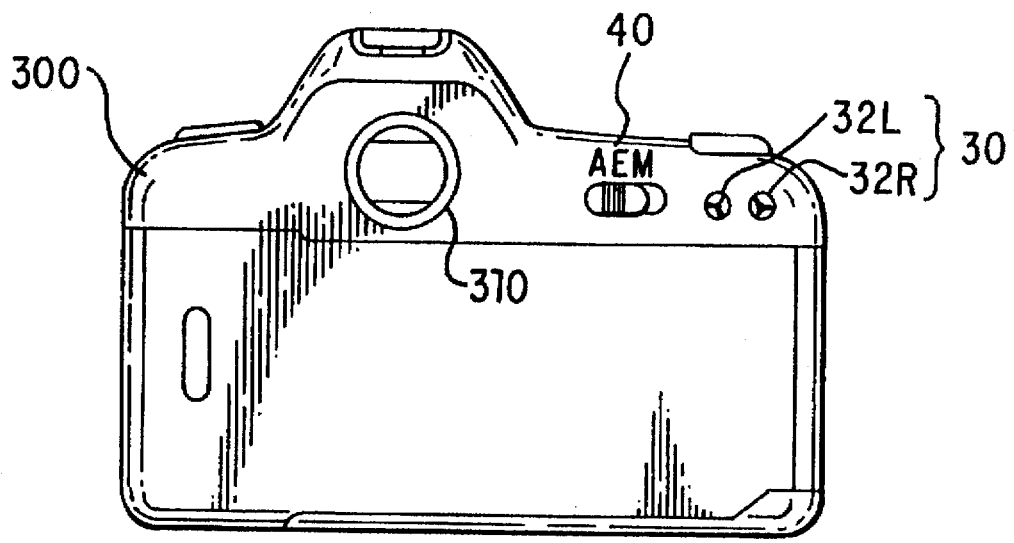
FIG. 6 is a rear view showing an example of the auto focus manual selection system and the auto focus region selection switching system used in the embodiment of FIG. 1.

The auto focus region selection switch system 40 is a system used by the photographer to select a mode in establishing an auto focus region. More specifically, the system can be positioned on the right shoulder of the back side of the body of the camera 300 as shown in FIG. 6 and can be comprised of a slide switch, for example. The auto focus region selection switching system 40 of FIG. 6 is a three-way switch (A: automatic selection mode, E: visual line selection mode, M: manual selection mode). An auto focus region is selected using one of the three modes. In other words, when automatic selection mode A is used, the camera establishes an auto focus region automatically. When the manual selection mode M is used, auto focus operations are executed only in an auto focus region that is selected manually. Finally, if the visual line selection mode is used, an auto focus region is established, in general, under that mode (i.e., based upon the photographer's visual line). However, if one of the shift buttons 32L or 32R is pushed during the selection operation, the system moves to the manual selection mode M and manual selection operation takes over, i.e., overrides the mode selected by the autofocus region selection switching system 40. In this case, if a specific operation is not executed during the preset time interval, the system returns to the visual line selection mode E when the autofocus region selection switching system 40 indicates that mode. This is different from the case in which the manual selection mode M is chosen by the auto focus selection switching system 40.

A timer 130 is connected to the control system 100. Timer 100 counts the elapsed time for controlling the control system 100 during the operation of the camera. With the present embodiment, the timer, among other things, establishes the control time during which the manual selection mode is maintained when one of the shift buttons 32L or 32R is pushed, when the camera is in the visual line selection mode E as explained above. When the control time elapses, the visual line selection mode is restored.

Furthermore, switches SW0, SW1, and SW2 are connected to the control system 100. Switch SW0 is a power source switch. Switches SW1 and SW2 in the embodiment operate corresponding to the half-depression and full-depression of the release button. In other words, switch SW1 turns on with a half-depression of the release button. With the present embodiment, when information indicating the turning ON of SW1 is entered in the control system 100, executions such as verification of the fixation point and the auto focus operation take place, as explained in detail later. Switch SW2 turns ON with a full-depression of the release button. With the present embodiment, when information indicating the turning ON of SW2 is entered into the control system 100, executions such as the photographic operation take place, which will be explained in detail later.

Next, the operation of the embodiment is described hereafter, centering around the operation associated with the establishment of an auto focus region, and with reference to FIGS. 2–5.

Figure 2:
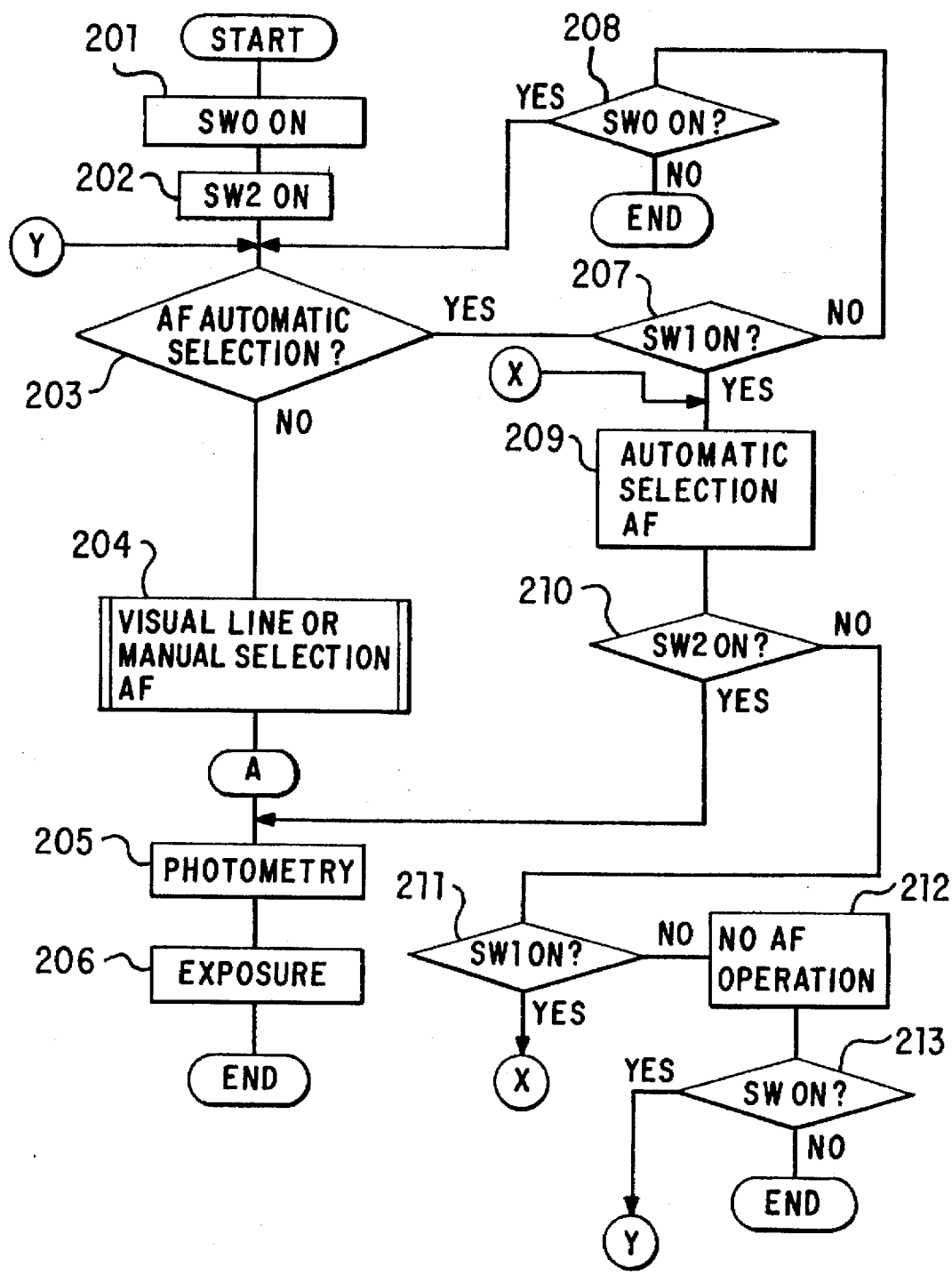
FIG. 2 is a flow chart showing an example of the auto focus selection switching process in the embodiment of FIG. 1.

An overview of the auto focus operation and the establishment of an auto focus region will be explained using FIG. 2.

To begin with, the power source switch of the camera is turned ON and the control system 100 starts up (step 201). In this instance the CPU 110 executes various initializing operations according to the programs stored in memory 120. In this state, the CPU 110 is ready at all times to receive interruptions from the turning ON of switch SW2 (step 202). When an interruption occurs, the CPU 110 jumps to A in FIG. 2.

Next, the CPU 110 determines whether the auto focus region selection mode is the automatic selection mode (step 203). This is accomplished by checking the state of the auto focus region selection switch system 40. If either visual line selection mode or the manual selection mode is established here, the CPU 110 executes the auto focusing of whichever mode is being selected (step 204). These operations will be explained later. Then the CPU 110, receiving luminance data from the photometric system 90, executes the photometry processing program stored in the memory 120 (step 205). Also, after the completion of the photometry processing program above, CPU 110 executes shutter and diaphragm control based upon the photometry processing data (step 206), which concludes the photographic operation.

On the other hand, if the auto focus region selection is in automatic mode, the CPU 110 determines whether switch SW1 is turned ON (step 207). This is accomplished by checking the condition of switch SW1. If the switch is not ON, the CPU 110 determines whether the power source switch SW0 is on (step 208). If the switch SW0 is OFF, the operation of the camera is completed. If the switch SW0 is ON, the process returns to step 203.

If the switch SW1 is ON, an automatic mode auto focus region selection system in the CPU 110 executes multi-area auto focus, that is, automatic mode auto focus region selection. Based upon this execution, the CPU 110 accomplishes the auto focus operation (step 209). Then the CPU 110 determines whether switch SW2 is ON (step 210). If switch SW2 is ON, the CPU 110 jumps to A and executes the photometry process of step 205 and subsequent processes.

If switch SW2 is not ON, the CPU 110 checks whether switch SW1 is ON (step 211). If the switch SW1 is ON, the CPU 110 returns to step 209 and repeats the auto focus operation. If the switch SW1 is not ON, the CPU 110 prohibits the auto focus operation (step 212), assuming that the photographing of the subject is being halted. Then CPU 110 further checks whether the power source switch SW0 is ON (step 213). If the switch SW0 is ON, the CPU 110 returns to step 203. If it is not ON, the operation of the camera is completed.

When switch SW2 is turned ON in the process flow chart above, if there is an instruction from the photographer beforehand, depending on the condition at the time, or if information regarding the auto focus region is established before switch SW2 is pressed, the photo process is completed by executing photographic processing (photometry processing and exposure processing) based upon the auto focus region established before the pressing of switch SW2. Moreover, in the case when auto focus information is not established before the pressing of switch SW2, or in the case when there is no instruction from the photographer beforehand, the auto focus operation is carried out using default information stored in the memory 120. Instructions from the photographer can be executed by using such members as command dials. Exclusive selection switches can be provided as well. Moreover, selection information established by default can be, for example:

1. execution of auto focus processing by choosing AC in the middle as the auto focus region.
2. Or, the establishment of photo distance at Rm (4m, for example) and diaphragm at about F5.6–F8.

Figure 3:
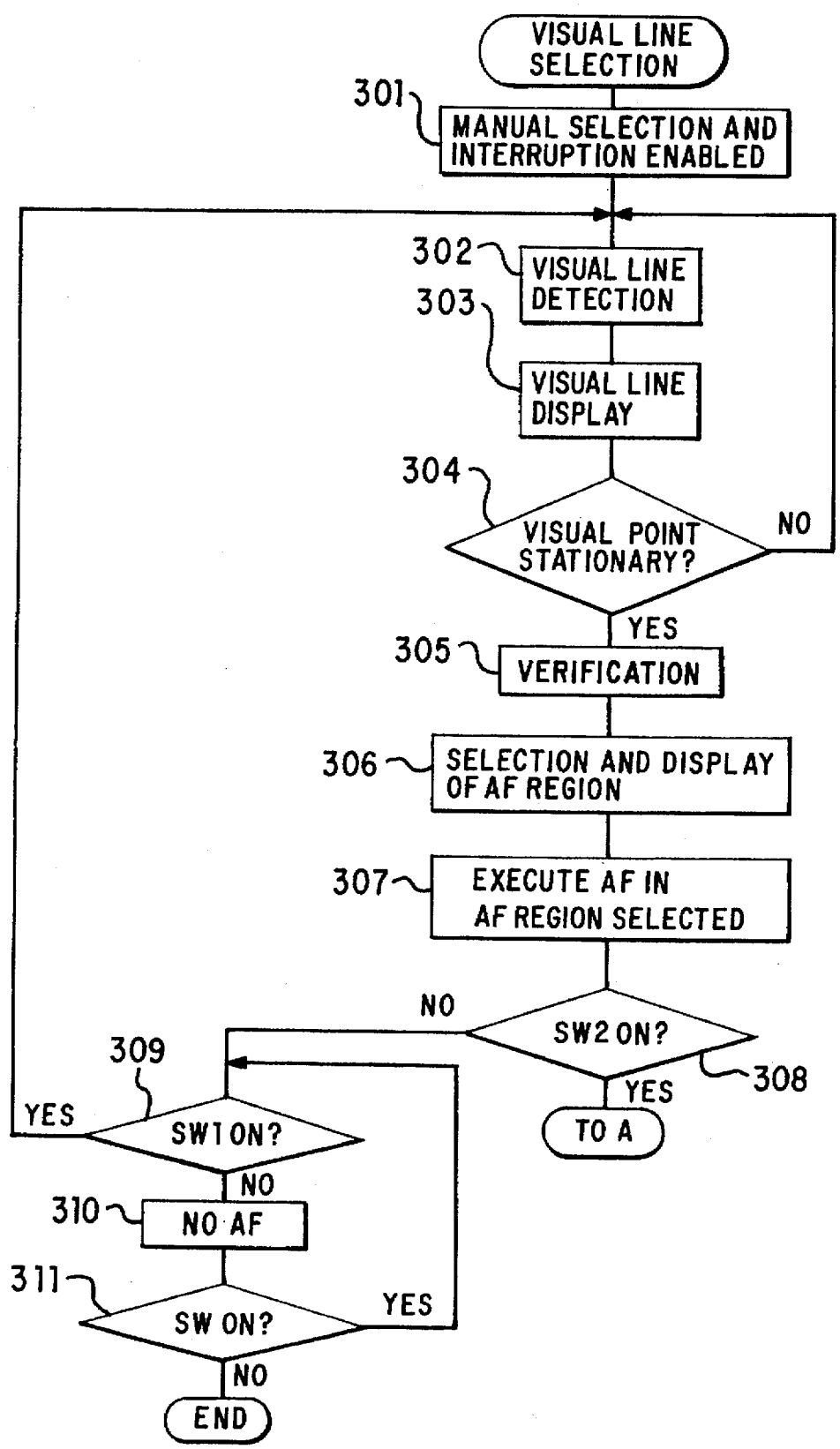
FIG. 3 is a flow chart showing an example of the auto focus operation process under visual line selection mode in the embodiment of FIG. 1.

Next, the auto focus region selection and the auto focus operation under visual line selection mode will be explained with reference to FIG. 3.

Initially, region selection by manual means and interruption of the auto focus operation are enabled in this mode as shown in step 301.

The CPU 110 drives the visual line detection system 10, and receives the data to execute computation of the fixation point (step 302). Based upon the information obtained regarding the fixation point, the CPU 110 displays the fixation point as illuminance point 1p using the visual point display system 20 as shown in FIG. 8. Thus, the current fixation point of the eyeball of the photographer looking through the finder is determined (step 303). In the case where the visual point display system 20 has the structure shown in FIG. 9, one of the light emitting diodes 21, 22, and 23 corresponding to the fixation point is made to flash based upon the information obtained regarding the fixation point.

Next, the CPU 110 verifies the fixation point (step 304). This involves a determination of whether the fixation point is stationary; that is, whether the fixation point remains in the same spot longer than a specified time. If the point does not remain stationary longer than the specified time, the CPU 110 returns to step 302. If the fixation point remains stationary longer than the specified time, the CPU 110 verifies the fixation point (step 305).

The CPU 110 gives the position of the auto focus region, in which the fixation point verified above exists, to the auto focus region display system 50 as the selected auto focus region. The auto focus region display system 50 causes the corresponding light emitting diode, among diodes 50, 51, and 52, to flash to display the auto focus region, the CPU 110 executing the auto focus operation for the selected region (steps 306 and 307).

Then, the CPU 110 determines whether switch SW2 is ON (step 308). If it is ON, the CPU 110 jumps to A in FIG. 2 above, and completes the photographic operation by executing step 205 and subsequent steps. On the other hand, if switch SW2 is not turned ON within the specified time interval, the CPU 110 checks whether switch SW1 is ON (step 309). If switch SW1 is ON, the CPU 110 returns to step 302 and accomplishes visual line detection again. If switch SW1 is not ON, the CPU 110 prevents the auto focus operation, assuming that the photographer halted the photographing of the subject (step 310). Then the CPU 110 determines whether the power source switch SW0 is ON. If the switch is ON, the CPU 110 returns to step 309.

Figure 4:
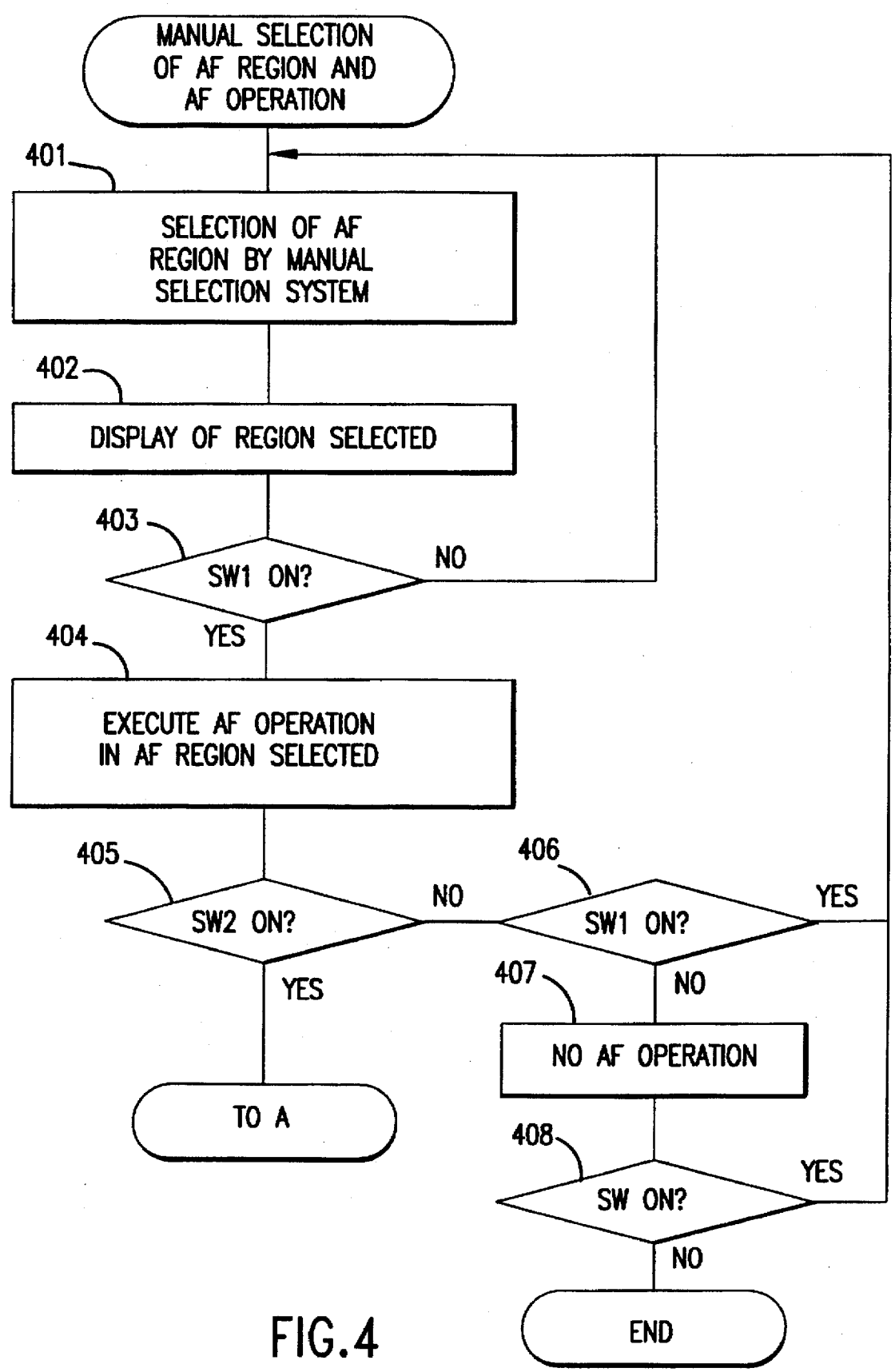
FIG. 4 is a flow chart showing an example of the auto focus operation process under manual selection mode in the embodiment of FIG. 1.

Next, the auto focus operation and auto focus region selection under manual selection mode will be described with reference to FIG. 4.

To begin with, this mode is established by setting the auto focus region selection switching system 40 to manual mode M (step 401). Selection by manual mode is executed by the auto focus region manual selection system 30. In other words, with a push of one of the shift buttons 32L and 32R, the CPU 110 sends signals indicating the selected auto focus region to the auto focus region display system 50 and flashes one of the light emitting diodes 51, 52, or 53 within the auto focus region display system 50 corresponding to the auto focus region selected (step 402).

Next, the CPU 110 determines whether switch SW1 is ON (step 403). If the switch is not ON, the CPU 110 returns to step 401, assuming that the above selection is not yet verified. On the other hand, if the switch is ON, the CPU 110 executes the auto focus operation for the auto focus region selected (step 404).

Here, the CPU 110 determines whether switch SW2 is ON (step 405). If the switch is ON, the CPU 110 jumps to A in FIG. 2 and executes the photometry and exposure process. However, if switch SW2 is not turned ON within the specified time interval, the CPU 110 checks to confirm if switch SW1 is ON (406). If the switch is ON, the CPU 110 returns to step 401. Moreover, if the switch is not ON, the CPU 110 prohibits the auto focus operation, assuming that the photographer has given up photographing the subject (step 407). Then, the CPU 110 checks whether the power source switch SW0 is ON. If the switch is not ON, the CPU 110 completes the operation of the camera. If the switch is ON, the CPU 110 returns to step 401 (step 408).

Figure 5:
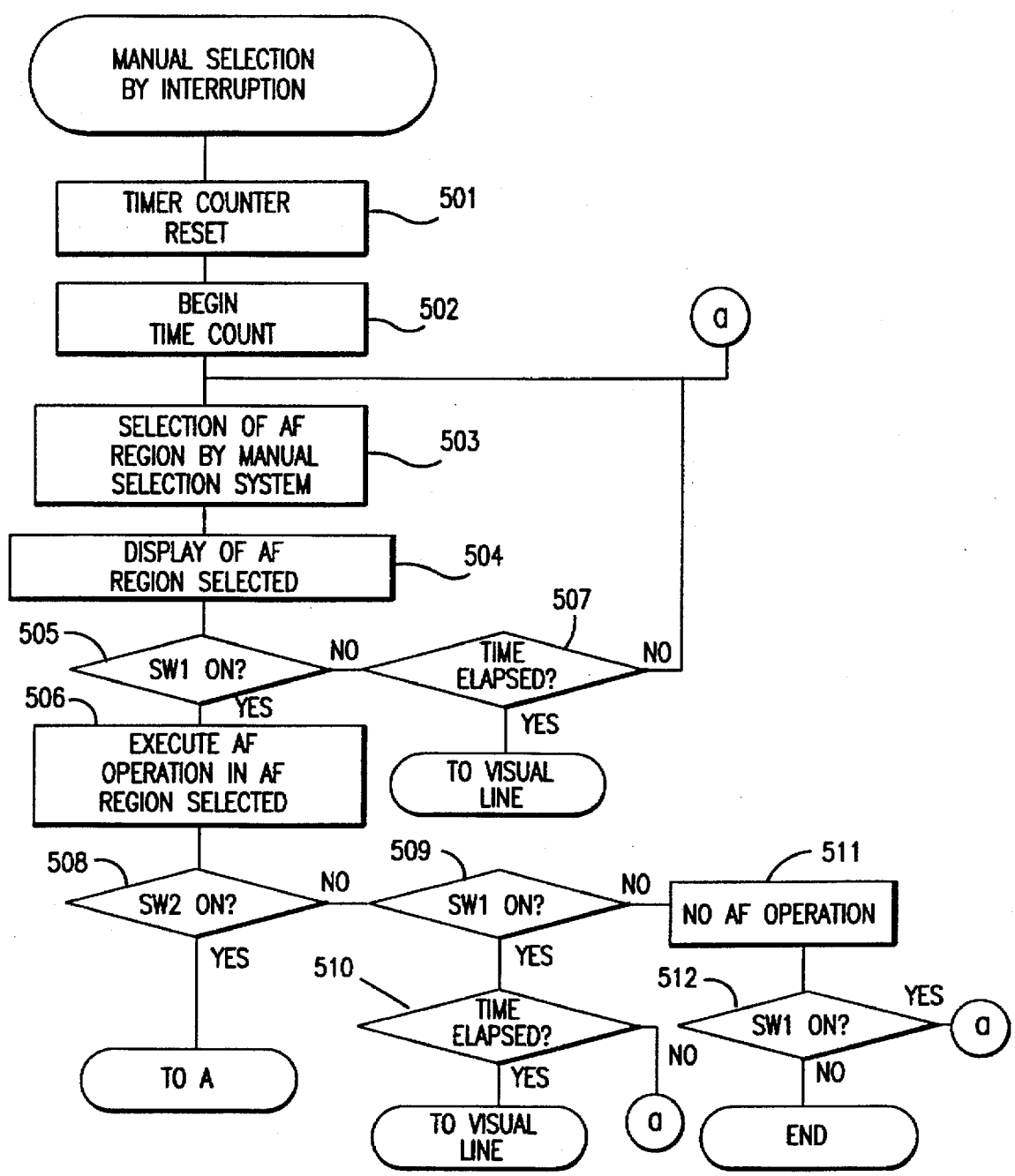
FIG. 5 is a flow chart showing an example of the manual selection interruption process under visual line selection mode in the embodiment of FIG. 1.

The process in which manual selection interrupts during visual line detection mode is described hereafter, with reference to FIG. 5.

First of all, when either of the shift buttons 32L and 32R is pressed during visual line detection mode, interruption occurs in the CPU 110 of the control system 100. Responding to the interruption, the CPU 110 executes the interruption process stored in the memory 120. Here, the CPU 110 resets the counter of the timer 130 and starts the time count (steps 501 and 502), the CPU 110 receiving the auto focus region selection from the auto focus region manual selection system 30 (step 503). The CPU 110 instructs the auto focus region display system 50 to display the auto focus region received (step 504). Thus, the auto focus region display system 50 flashes one of the light emitting diodes, 51, 52, or 53, which is located on the instructed position. However, if none of the shift buttons are pressed (i.e., the camera stays in the visual line detection mode), the displaying of the auto focus region is accomplished assuming that the current visual line condition is chosen.

Here, the CPU 110 checks whether switch SW1 is ON (step 505). If the switch is not ON, the CPU 110 checks whether the time on the timer 130 above has elapsed (step 507). If the time has not elapsed, the CPU 110 returns to step 503 and waits for any further selection. If the time has elapsed, visual line selection mode is restored.

Moreover, if switch SW1 is ON, the CPU 110 executes the auto focus operation in the auto focus region manually selected (step 506). Here, the CPU 110 checks whether switch SW2 is ON (step 508). If the switch SW2 is ON, the CPU 110 jumps to A in FIG. 2 and completes photography by executing the photometry and exposure process of step 205 and thereafter.

If the switch SW2 is not ON, the CPU 110 checks whether switch SW1 is ON (step 509). If the switch SW1 is on, the CPU 110 checks whether or not the time on the timer 130 has elapsed (step 510). If the time has not elapsed, the CPU 110 returns to step 503. If the time has elapsed, the visual line detection mode is restored. Moreover, if switch SW1 is not ON, the CPU 110 prohibits the auto focus operation, assuming that the photographer is not taking a picture of the subject (step 511). Then the CPU 110 checks whether the power source switch SW0 is turned ON (step 512). If the switch SW0 is ON, the CPU 110 returns to step 503. On the other hand, if the switch SW0 is not ON, the operation of the camera is completed.

As explained above, the camera in the present embodiment can realize the auto selection mode, visual line selection mode, and manual selection mode in establishing an auto focus region, with actual selection being enabled by the auto focus region switching system. Moreover, in the present embodiment, even when the selection of an auto focus region is executed by visual line selection mode, if the signals from the auto focus region manual selection system are entered, the manual selection input takes over and the intention of the photographer becomes the priority. Furthermore, a temporary change of mode is executed easily during visual line selection mode without special operation.

Furthermore, if manual selection does not take over after the changing of mode, visual line selection mode is restored automatically after the elapsing of a specified time.

Figure 7:
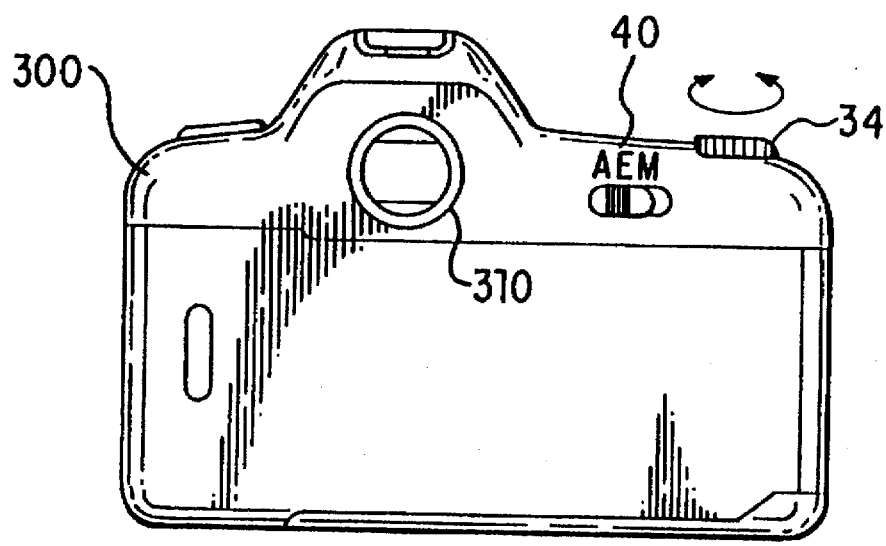
FIG. 7 is a rear view showing another example of the auto focus manual selection system and the auto focus region selection switching system used in the embodiment of FIG. 1.

In the above embodiment, shift buttons 32L and 32R are used as an example of the auto focus region manual selection system 30, but the present invention is not limited by the example. For example, the structure shown in FIG. 7 may be used. In FIG. 7, a command dial 34 is used as a selection system to switch selections. In that case, a rotation of command dial 34 during visual line selection mode triggers an interruption in the control system 100, and the manual selection priority process such as explained above is executed.

Moreover, in the above embodiment, the triggering of interruption is realized by such means as shift buttons and a command dial respectively, but a switch exclusively for interruption can be provided as well.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera operable in either of at least a visual line selection mode and a manual selection mode to select one of a plurality of auto focus regions in which to perform an auto focus operation, said camera comprising:

a visual line detection system that selects one of said auto focus regions when said camera is in said visual line selection mode;

an auto focus region manual selection system that provides for manual selection of one of said auto focus regions when said camera is in said manual selection mode; and a control system that executes the auto focus operation for said selected auto focus region, wherein said control system executes the auto focus operation for an auto focus region selected by said auto focus region manual selection system even when the camera is in the visual line selection mode, wherein in the visual line selection mode, said control system selects an auto focus region determined by said visual line detection system when a photographic operation is not executed using an auto focus region manually selected by said auto focus region manual selection system within a specified time of the manual selection.

2. The camera of claim 1, further comprising an auto focus region mode selection system that switches said camera between the visual line selection mode and the manual selection mode.

3. The camera of claim 1, further comprising:
a release button;
a first switch that is turned ON by half-depression of said release button, the turning ON of the first switch producing verification of the selection of an auto focus region in other than the manual selection mode; and a second switch that is turned ON by full depression of said release button.

4. The camera of claim 1, further comprising a timer that sets said specified time in the visual line selection mode, and wherein the control system starts the timer by the input of selection instruction signals from the auto focus manual selection system.

5. The camera of claim 1, further comprising:
a release button;
a first switch that is turned ON by half-depression of said release button; and
a second switch that is turned ON by full depression of said release button, wherein turning ON the second switch during an auto focus operation before an auto focus region has been selected causes the control system to execute the photographic operation without completion of the auto focus operation.

6. The camera of claim 5, wherein in the visual line selection mode the turning ON of said first switch causes the control system to execute an auto focus operation that selects an auto focus region that may be used in a photographic operation caused by turning ON said second switch.

7. The camera of claim 5, wherein said control system includes default information that is used to select an auto focus region when the second switch is turned ON before completion of an auto focus operation.

8. The camera of claim 1, wherein the camera includes a finder that includes a display that indicates an auto focus region selected for the auto focus operation.

9. The camera of claim 1, wherein the visual line detection system can be used for the selection of functions other than the selection of the auto focus region.

10. A camera operable in one of an auto selection mode, a visual line selection mode and a manual selection mode to select one of a plurality of auto focus regions in which to perform an auto focus operation, said camera comprising:

a visual line detection system that selects one of said auto focus regions when said camera is in said visual line selection mode;

a manual selection system that provides for manual selection of one of said auto focus regions when said camera is in said manual selection mode; and a control system that executes the auto focus operation for said selected auto focus region, wherein said control system executes the auto focus operation for an auto focus region selected by said auto focus region manual selection system even when the camera is in the visual line selection mode wherein said camera is further operable in an automatic selection mode and further comprises:

an automatic mode auto focus region selection system that performs an auto focus operation based on a plurality of auto focus regions when the camera is in the automatic selection mode; and a three-way switch that is manually movable to select from between the automatic selection mode, the visual line selection mode, and the manual selection mode.

11. A camera operable in either of at least a visual line selection mode and a manual selection mode to select one of a plurality of auto focus regions in which to perform an auto focus operation, said camera comprising:

means for selecting one of said auto focus regions when said camera is in said visual line selection mode;

means for providing manual selection of one of said auto focus regions; and means for executing the auto focus operation for said selected auto focus region, wherein said means for executing executes the auto focus operation for the auto focus region selected by said means for providing manual selection when the camera is in the visual line selection mode, wherein in the visual line selection mode, said selecting means selects an auto focus region determined by visual line detection when a photographic operation is not executed using an auto focus region manually selected by manual selection within a specified time of the manual selection.

12. The camera of claim 11, further comprising means for controlling switching between the visual line selection mode and the manual selection mode.

13. The camera of claim 11, further comprising means for executing a photographic operation without completion of the auto focus operation on the selected auto focus region.

14. The camera of claim 13, further comprising means for providing default information for determining the focus of the camera when the photographic operation is executed without completion of the auto focus operation on the selected auto focus region.

15. The camera of claim 11 further operable in an automatic selection mode, said camera further comprising:

means for performing the auto focus operation based on said plurality of auto focus regions when the camera is in the automatic selection mode; and means for switching between the automatic selection mode, the visual line selection mode, and the manual selection mode.

16. A method of selecting between a plurality of available auto focus regions in which to perform an auto focus operation in a camera operable in at least a visual line selection mode in which one of said auto focus regions is automatically selected based on a visual line of a photographer, comprising the following steps:

(a) selecting the visual line selection mode;
(b) at least beginning to select one of said auto focus regions using said visual line selection mode;
(c) manually selecting one of said auto focus regions without exiting said visual line selection mode;
(d) performing the auto focus operation based on the auto focus region manually selected; and
(e) performing the photographic operation, the method further comprising the following step:
completing the selection of the auto focus region using the visual line selection mode and disregarding the auto focus region manually selected when photography is not completed with a predetermined time period after performing step (c).

17. The method of claim 16, further comprising the following steps:

closing a switch by half-depressing a release button;
determining that the switch has been closed before proceeding with step (d).

18. The method of claim 16, further comprising visually indicating the manually selected auto focus region in a finder of said camera.

19. The method of claim 16, wherein said camera is operable in a manual selection mode in which the photographer manually selects one of the plurality of auto focus regions, said camera including a mode selection switch for switching between the visual line selection mode and the manual selection mode, and wherein step (c) is performed while said mode selection switch places said camera in said visual line selection mode.

* * * * *